United States Patent
Rose

(10) Patent No.: US 10,545,954 B2
(45) Date of Patent: Jan. 28, 2020

(54) DETERMINING SEARCH QUERIES FOR OBTAINING INFORMATION DURING A USER EXPERIENCE OF AN EVENT

(71) Applicant: Google Inc., Mountain View, CA (US)

(72) Inventor: Robert Brett Rose, Boulder, CO (US)

(73) Assignee: Google LLC, Mountain View, CA (US)

( * ) Notice: Subject to any disclaimer, the term of this patent is extended or adjusted under 35 U.S.C. 154(b) by 182 days.

(21) Appl. No.: 15/459,537

(22) Filed: Mar. 15, 2017

(65) Prior Publication Data

US 2018/0268022 A1 Sep. 20, 2018

(51) Int. Cl.
| | | |
|---|---|---|
| *G06F 17/00* | (2019.01) | |
| *G06F 16/242* | (2019.01) | |
| *G06F 16/248* | (2019.01) | |
| *G06F 16/2455* | (2019.01) | |
| *G06F 16/2458* | (2019.01) | |
| *G06F 16/9535* | (2019.01) | |
| *G06F 16/951* | (2019.01) | |
| *G06F 17/30* | (2006.01) | |

(52) U.S. Cl.
CPC ......... *G06F 16/242* (2019.01); *G06F 16/248* (2019.01); *G06F 16/2455* (2019.01); *G06F 16/2477* (2019.01); *G06F 16/951* (2019.01); *G06F 16/9535* (2019.01)

(58) Field of Classification Search
None
See application file for complete search history.

(56) References Cited

U.S. PATENT DOCUMENTS

| | | | | |
|---|---|---|---|---|
| 7,624,416 | B1 * | 11/2009 | Vandermolen | H04H 60/33 725/109 |
| 8,180,688 | B1 * | 5/2012 | Velummylum | G06Q 30/0201 705/26.1 |
| 9,177,225 | B1 * | 11/2015 | Cordova-Diba | G06T 5/00 |
| 9,197,911 | B2 | 11/2015 | Evans et al. | |
| 9,374,411 | B1 * | 6/2016 | Goetz | H04L 67/02 |
| 9,396,180 | B1 * | 7/2016 | Salvador | H04N 21/233 |
| 9,778,830 | B1 * | 10/2017 | Dubin | A63F 13/65 |
| 2005/0283753 | A1 * | 12/2005 | Ho | G06F 17/30958 717/102 |
| 2008/0271078 | A1 | 10/2008 | Gossweiler et al. | |

(Continued)

OTHER PUBLICATIONS

Randall A. Lewis, David H. Reiley "Down-to-the-Minute Effects of Super Bowl Advertising on Online Search Behavior", 2013 ACM (Year: 2013).*

(Continued)

*Primary Examiner* — Polina G Peach
(74) *Attorney, Agent, or Firm* — Shumaker & Seiffert, P.A.

(57) ABSTRACT

A computing system is described that determines a plurality of search queries for subsequent search during an event, and schedules, for each of the plurality of search queries, a respective time during the event to search the corresponding search query. Responsive to determining that a user of a computing device is experiencing the event at the respective time during the event at which a particular search query from the plurality of search queries is scheduled to be searched, the computing system searches the particular search query and automatically sends, to the computing device for subsequent display during the event, an indication of information returned from the search of the particular search query.

17 Claims, 5 Drawing Sheets

(56) References Cited

U.S. PATENT DOCUMENTS

| | | | |
|---|---|---|---|
| 2009/0055385 A1 | 2/2009 | Jeon et al. | |
| 2009/0089352 A1* | 4/2009 | Davis | G06Q 10/00 709/201 |
| 2009/0091798 A1* | 4/2009 | Lawther | G06F 16/58 358/3.28 |
| 2009/0228464 A1* | 9/2009 | Jones | G06F 17/30522 |
| 2009/0249244 A1* | 10/2009 | Robinson | G06F 3/0481 715/781 |
| 2010/0040220 A1* | 2/2010 | McGary | H04M 3/4931 379/265.09 |
| 2011/0099197 A1* | 4/2011 | Wang | H04H 60/37 707/769 |
| 2011/0126252 A1* | 5/2011 | Roberts | H04N 7/17318 725/114 |
| 2011/0138416 A1* | 6/2011 | Kang | G06F 3/0482 725/39 |
| 2011/0167357 A1* | 7/2011 | Benjamin | H04L 12/1818 715/753 |
| 2011/0238647 A1* | 9/2011 | Ingram | G08G 1/20 707/706 |
| 2011/0264682 A1* | 10/2011 | Song | H04N 5/44513 707/769 |
| 2013/0185734 A1* | 7/2013 | Gall | G06F 9/542 719/318 |
| 2013/0326406 A1* | 12/2013 | Reiley | G06F 3/048 715/810 |
| 2014/0007171 A1* | 1/2014 | Yang | G06F 16/683 725/109 |
| 2014/0068665 A1* | 3/2014 | Evans | H04N 21/4781 725/37 |
| 2014/0129570 A1 | 5/2014 | Johnson | |
| 2014/0165105 A1* | 6/2014 | Mountain | H04N 21/42203 725/46 |
| 2014/0172847 A1* | 6/2014 | Wiegering | G06F 17/30864 707/728 |
| 2014/0195028 A1* | 7/2014 | Emerson, III | G10L 19/018 700/94 |
| 2014/0222549 A1* | 8/2014 | Bruich | H04H 60/33 705/14.41 |
| 2014/0280879 A1* | 9/2014 | Skolicki | H04L 67/22 709/224 |
| 2014/0282745 A1* | 9/2014 | Chipman | H04N 21/47214 725/61 |
| 2015/0149482 A1* | 5/2015 | Finkelstein | G06F 17/30672 707/748 |
| 2015/0281763 A1 | 10/2015 | Bertrand et al. | |
| 2015/0310894 A1* | 10/2015 | Stieglitz | H04N 21/47217 386/241 |
| 2015/0347597 A1* | 12/2015 | Kim | G06F 16/7844 707/706 |
| 2015/0371276 A1 | 12/2015 | Niyogi et al. | |
| 2016/0037227 A1* | 2/2016 | Benn | H04N 21/4828 725/53 |
| 2016/0092598 A1* | 3/2016 | Mishra | G06F 16/9535 707/740 |
| 2016/0132575 A1* | 5/2016 | Fletcher | G06F 16/903 707/722 |
| 2016/0381427 A1* | 12/2016 | Taylor | G06Q 30/00 725/13 |
| 2018/0246967 A1* | 8/2018 | Hill | G06F 16/29 |

OTHER PUBLICATIONS

Second Written Opinion of International Application No. PCT/US2017/059361, dated Jun. 6, 2018, 11 pp.

Response to Written Opinion dated Jun. 6, 2018, from International Application No. PCT/US2017/059361, filed Jul. 20, 2018, 3 pp.

International Search Report and Written Opinion from International Application No. PCT/US2017/059361, dated Jan. 15, 2018, 18 pp.

Response to Written Opinion dated Jan. 15, 2018, from International Application No. PCT/US2017/059361, filed Apr. 30, 2018, 8 pp.

Combined Search & Examination Report from counterpart United Kingdom Application No. 1717839.3, dated Apr. 20, 2018, 6 pp.

YouTube, "Manage Your Watch History," retrieved from https://support.google.com/youtube/answer/95725?hl=en, Nov. 22, 2016, 3 pp.

International Preliminary Report on Patentability from International Application No. PCT/US2017/059361, dated Oct. 11, 2018, 19 pp.

Response to Combined Search & Examination Report from counterpart United Kingdom Application No. 1717839.9, filed Jul. 3, 2018, 3 pp.

* cited by examiner

DETERMINING SEARCH QUERIES FOR OBTAINING INFORMATION DURING A USER EXPERIENCE OF AN EVENT

BACKGROUND

While experiencing an event (e.g., watching and/or listening to a presentation of content), a user may wish to obtain secondary information related to the event and may therefore interact with a computing device to manually search for such information while experiencing the event. Manually searching for information during an event may cause the user to miss part of the event or other relevant and interesting information about the event.

Some computing devices may automatically output secondary information as part of a "second-screen experience" that has been pre-produced to enhance a user experience of an event. For example, some such computing devices may output specific information that has been predetermined and cached in a memory, for later presentation at specific times during the user experience of the event. Pre-producing a second-screen experience may be a time consuming and resource intensive task that may need to occur manually, before a presentation of the event occurs. Over time, the secondary information that has been cached for subsequent output as part of a pre-produced, second-screen experience may become stale or may not always be the most interesting, current, or relevant information that could be output during future presentations of the event.

SUMMARY

In general, techniques of this disclosure may enable a system to, while a user of a computing device is experiencing an event, dynamically obtain, and cause the computing device to present current information that is relevant to the event. The term "event" as used herein refers to any live performance, broadcast, playback, or other type of presentation of live or pre-recorded content (e.g., meeting presentations, assemblies, conferences, musical or theatrical performances, movies, television shows, songs, concerts, sports events, or any other types of live or pre-recorded content that users may experience). By the terms "live event" or "live performance" we mean any event that the user is actually in attendance. Broadcast content may be broadcast at the time of the event, without significant delay, and may sometimes be termed "live" but for this we use the term "live broadcast". Content may also be recorded or played back at later times.

While viewing, listening to, or otherwise "experiencing" an event, a user may wish to obtain secondary information about the event, at precise timestamps, or in response to particular "subevents" occurring, during the event. For example, while watching a sports event, a user may be interested in obtaining biographical information of a lesser-known player that just made an important play, or may be interested in seeing a replay of the important play. Or, while watching a movie, a user may be interested in seeing vacation deals or other information about an exotic geographical location that is the backdrop of a particular scene. Or while watching a movie or TV presentation, the user may wish to obtain biographical and other acting information about the actors, as they appear on the screen.

The system may pre-determine and store (e.g., in cache or other memory) one or more search queries for subsequent search when a user of a computing device is experiencing the event. After receiving explicit permission to analyze search histories or other information about users of a group of computing devices, the system may determine one or more search queries for subsequent search by identifying the queries that the group of computing devices searched while the users of the group of computing devices were experiencing the same or similar event. The system may identify when (e.g., a particular timestamp or subevent of the event) the group of computing devices searched each predetermined query and assign each predetermined query for subsequent search at a particular timestamp or subevent, of the event.

After receiving explicit permission to analyze information about a user of the computing device to determine whether he or she is experiencing an event, and in response to determining that the user of the computing device is experiencing a particular subevent or timestamp of the event, the system may search the particular search query that is assigned to the particular timestamp or subevent, of the event and cause the computing device to present secondary information obtained from the search while the user of the computing device is experiencing the particular timestamp or subevent, of the event. In this way, rather than require the user to manually provide input to a computing device to search for secondary information, or interact with a pre-produced secondary-screen experience that may rely on stale information, the system may enable the computing device to automatically present up-to-date secondary information, at a time during the event, when the secondary information is most relevant to a particular timestamp or sub-event, of the event. By providing such secondary information automatically the user does not miss a portion of the event such as he may do so conventionally during the inputting of the search query. Furthermore, as a result of the automatic provision of secondary information through the use of pre-defined search queries, the use of computing and network resources is reduced. For example, conventionally a user may input multiple queries until he finds the information he desires related to the event, whereas aspects of this disclosure provide information directly linked to the event, thereby reducing the number of searches which produce irrelevant information or information not desired by the user.

In one example, the disclosure is directed to a method that includes determining a plurality of search queries for subsequent search during an event, and scheduling, for each of the plurality of search queries, a respective time during the event to search the corresponding search query. The method further includes responsive to determining that a user of a computing device is experiencing the event, at the respective time during the event, at which a particular search query from the plurality of search queries is scheduled to be searched: searching the particular search query, and outputting, by the computing device, during the event, an indication of information returned from the search of the particular search query.

In another example, the disclosure is directed to a computing system that includes at least one processor and a memory comprising instructions that, when executed, cause the at least one processor to: determine a plurality of search queries for subsequent search during an event, and schedule, for each of the plurality of search queries, a respective time during the event to search the corresponding search query. The instructions, when executed, further cause the at least one processor to responsive to determining that a user of a computing device is experiencing the event, at the respective time during the event, at which a particular search query from the plurality of search queries is scheduled to be searched: search the particular search query, automatically send, to the computing device for subsequent display during the event, an indication of information returned from the search of the particular search query.

In another example, the disclosure is directed to a computer-readable storage medium including instructions that, when executed, cause at least one processor of a computing system to determine a plurality of search queries for subsequent search during an event, and schedule, for each of the plurality of search queries, a respective time during the event to search the corresponding search query. The instructions, when executed, further cause the at least one processor to responsive to determining that a user of a computing device is experiencing the event, at the respective time during the event, at which a particular search query from the plurality of search queries is scheduled to be searched: search the particular search query, automatically send, to the computing device for subsequent display during the event, an indication of information returned from the search of the particular search query In another example, the disclosure is directed to a system including means for determining a plurality of search queries for subsequent search during an event, and scheduling, for each of the plurality of search queries, a respective time during the event to search the corresponding search query. The system further includes means for responsive to determining that a user of a computing device is experiencing the event, at the respective time during the event, at which a particular search query from the plurality of search queries is scheduled to be searched: means for searching the particular search query, and means for outputting, during the event, an indication of information returned from the search of the particular search query.

The details of one or more examples are set forth in the accompanying drawings and the description below. Other features, objects, and advantages of the disclosure will be apparent from the description and drawings, and from the claims.

DETAILED DESCRIPTION

Figure 1:
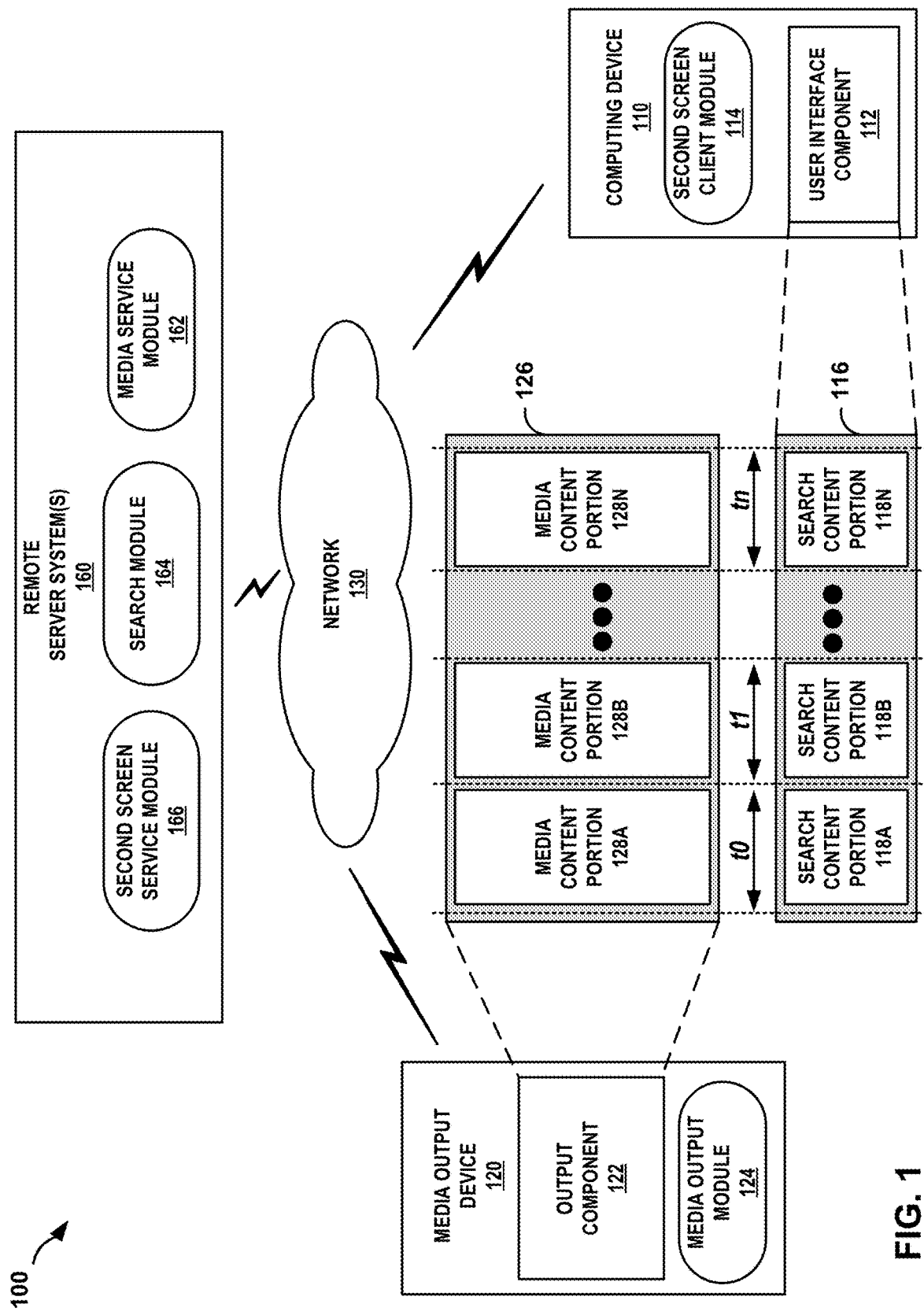
FIG. 1 is a conceptual diagram illustrating an example system for presenting information related to an event that has been returned from searches executed at predetermined times when a user of a computing device is experiencing the event, in accordance with one or more aspects of the present disclosure.

FIG. 1 is a conceptual diagram illustrating an example system for presenting information related to an event that has been returned from searches executed at predetermined times when a user of a computing device is experiencing the event, in accordance with one or more aspects of the present disclosure. System 100 includes one or more remote server systems ("RSS") 160 in communication, via network 130, with media output device 120 and computing device 110. RSS 160 includes media service module 162, search module 164, and second-screen service ("SSS") module 166. Media output device 120 includes output component 122 and media output module 124. Computing device 110 includes user interface component ("UIC") 112 and second-screen client ("SSC") module 114.

Network 130 represents any public or private communications network, for instance, cellular, Wi-Fi, and/or other types of networks, for transmitting data between computing systems, servers, and computing devices. Network 130 may include one or more network hubs, network switches, network routers, or any other network equipment, that are operatively inter-coupled thereby providing for the exchange of information between RSS 160, media output device 120, and computing device 110. RSS 160, media output device 120, and computing device 110 may transmit and receive data across network 130 using any suitable communication techniques.

RSS 160, media output device 120, and computing device 110 may each be operatively coupled to network 130 using respective network links. The links coupling RSS 160, media output device 120, and computing device 110 to network 130 may be Ethernet, ATM or other types of network connections, and such connections may be wireless and/or wired connections.

Media output device 120 represents any suitable output device for presenting, as user interface 126, media content received from a media service provider, such as RSS 160. Media output module 124 is configured to receive media content from a media service provider (e.g., television provider, cable provider, online streaming service provider, etc.) and output the media content via output component 122. For example, media output device 120 may be a television and output component 122 may be a television screen and/or speaker. Media output device 120 may be a computing device and output component 122 may be a display, a projector and screen, a speaker, a virtual reality (VR) headset, head phones, or any other type of display and/or speaker that is operatively coupled to media output device 120 and configured to output media content. Media output device 120 may be a set-top device or a media streaming device and output component 122 may be a display and/or speaker system that is operatively coupled to media output device 120. Media output device 120 may be a radio (e.g., of a home or automotive entertainment system) and output component 122 may be a speaker system that is operatively coupled to media output device 120.

Media output module 124 may communicate with media service module 162 of RSS 160, process media content received from RSS 160, and output the received and processed media content for presentation at output computing 122. Media output module 124 may perform operations described herein using software, hardware, firmware, or a mixture of hardware, software, and firmware residing in and/or executing at media server system 80. For example, media output module 124 may include at least one processor and a memory storing instructions, that when executed, cause the at least one processor to perform the operations attributed to media output module 124. Media output module 124 may perform operations with multiple processors, as one or more virtual machines executing on underlying hardware of media output device 120, as one or more services of an operating system or computing platform of media output device 120, and/or as one or more executable programs at an application layer of a computing platform of media output device 120.

Media output module 124 may receive streaming audio and video via network 130 from media service module 162. Media output module 124 may format and optimize the streaming audio and video for output and display as multimedia content at output component 122. Media output module 124 may transmit the multimedia content to output component 122 and output component 122 may output and display the multimedia content as user interface 126, at speakers and a screen of output component 122. For example, as shown in FIG. 1, user interface 126 includes media content portions 128A-128N (collectively, "media content portions 128") presented in chronological order from times t0-tn. Each one of media content portions 128 may be a particular frame, chapter, or other type of sub-event of an event.

RSS 160 represents any suitable remote computing system or systems (e.g., one or more desktop computers, one or more laptop computers, one or more mainframes, one or more servers, one or more cloud computing systems, or one or more other types of remote computing systems) capable of exchanging information via network 130. Modules 162, 164, and 166 may perform operations described herein using software, hardware, firmware, or a mixture of hardware, software, and firmware residing in and/or executing at RSS 160. RSS 160 may execute modules 162, 164, and 166 with multiple processors or multiple devices, as virtual machines executing on underlying hardware, as one or more services of an operating system or computing platform, and/or as one or more executable programs at an application layer of a computing platform of RSS 160.

Media service module 162 performs functions for hosting a media service that provides multimedia broadcasts or streams of events, via network 130, to computing devices associated with subscribers of the media service (e.g., media output device 120, computing device 110, etc.). Examples of events include: movies, music performances (e.g., audio and/or videos of studio or live music performances), television shows, sporting events, holiday events (e.g., parades, New Years celebrations), scientific or technology events (e.g., moon/mars landings), political events (conventions, elections, inaugurations), theatrical or performance art events, breaking news events, or any other type of audible or visual experience that a person may experience live (e.g., in-person) or remotely via a media output device, such as media output device 120.

For example, media service module 162 may host a streaming video-on-demand service from which a user of media output device 120 can access, on-demand, movies, television shows, music, and other types of media content. Media service module 162 may host a television broadcasting service (e.g., one or more television channels) from which a user of media output component 122 can access media content based on a live or on-demand television broadcast. Media service module 162 may transmit media content associated with the media service it provides to network 130. Media output device 120 and/or computing device 110 may receive the media content being transmitted by media service module 162 across network 130 and output (e.g., at display component 122 of media output device 120 or user interface component 112 of computing device 110) graphical and/or audible information derived from the transmitted media content.

Search module 164 performs functions for hosting a search service that provides information returned from searches conducted across a variety of information sources (e.g., webpages, web services, applications, or other information sources) that search module 164 accesses via the internet, via network 130, and/or via local storage at RSS 160. Search module 164 may search for information that is relevant to a search query that search module 164 receives from SSS module 166 and/or computing device 110. After executing a search, search module 164 may output the information returned from the search (e.g., the search results) to the originator of the query (e.g., second-screen service module 166 and/or computing device 110) or to some other device communicating via network 130.

In general, SSS module 166 hosts a second-screen service that automatically provides up-to-date, secondary information, related to a live or pre-recorded event. SSS module 166 obtains secondary information from searches that SSS module 166 causes to be executed at predetermined times during a user experience of the live or pre-recorded event. SSS module 166 provides the secondary information following execution of the searches, at the predetermined times, to supplement or otherwise enhance the user experience of the primary content of the event being presented at the predetermined times. In other words, SSS module 166 dynamically obtains, and causes computing devices to present, secondary information that users of the computing devices who are experiencing the event, will likely want to search for, at the time the secondary information is being presented.

For example, while a user of computing device 110 is watching or listening to primary content of an event (e.g., a television show broadcast being output by media output device 120, a live sporting event occurring near a location of computing device 110, etc.) SSS module 166 may determine whether the user is experiencing, or is about to experience, a particular sub-event (e.g., time-stamp or occurrence of subevent) of the event. In response to determining the user is about to experience or is experiencing the particular sub-event, SSS module 166 may send a search query associated with the sub-event to search module 164 with a request for secondary content (e.g., contextual background, references, links to further exploration, images and maps, and other event related information) about the search query and the sub-event. SSS module 166 may obtain from search module 164 the secondary content in response to the request.

SSS module 166 may only use, analyze, or store information about users of computing devices after explicitly receiving consent from each of the users to do so. In addition, any information retained by SSS module 166 may be treated or encrypted to remove or otherwise protect the identity of the individual users. SSS module 166 allows users to withdraw consent thereby causing SSS module 166 to cease using, analyzing, or storing their information.

SSS module 166 may package and output, to computing device 110, the secondary content it receives from search module 164 with instructions for how and when computing device 110 is to output the secondary content. The instructions may cause computing device 110 to output the secondary content in-synch with the sub-event (e.g., as the user experiences the sub-event). In other words, the instructions may cause computing device 110 to present the secondary content at a time when its presentation will be most relevant to the primary content being experienced by the user. Because SSS module 166 obtains the secondary content from searches executed during the user's experience of the event, the secondary content is more likely to contain current (e.g., up-to-date and not stale) information about the subevent.

SSS module 166 may determine search queries for subsequent search during an event. SSS module 166 may determine the search queries to be popular search queries searched by multiple computing devices while users of the multiple computing devices were experienced the same or similar event. SSS module 166 may rely on data collected by search module 164 and media service module 162 to determine which searches were executed by search module 164 when media service module 162 was outputting various types of multimedia broadcasts or streams of events.

Using a model (e.g., deep-learning models, long-or-short term memory models, Bayesian networks, artificial neural networks, or any other machine-learned models, artificial intelligence models, and other types of models), SSS module 166 may analyze information about what types of searches that search module 164 executes while media service module 162 outputs certain types of multimedia broadcasts or streams of events. The model of SSS module 166 may generate rules that, in response to being input particular types of multimedia broadcasts or streams of events, may output one or more specific search queries that users experiencing the events would likely want to have searched during the event.

SSS module 166 may enhance or modify a search queries based on supplemental information that SSS module 166 obtains about a particular event. The supplemental information may include topics or keywords associated with an event (e.g., from semantic text associated with an event, meta information about an event, knowledge graphs of an event, online encyclopedias and other references that are accessible to RSS 160 and SSS module 166). SSS module 166 may identify topics or keywords associated with the event and generate, using the text of the identified topics or keywords, search queries related to the event. For example, if an event is a particular movie, SSS module 166 may use search module 164 to execute a search using the name of the movie as the search query so as to identify the actors, the era, the genre, the setting, and other topics related to the particular movie. Rather than create general search queries (e.g., a search query that specifies "actors" in a general sense) SSS module 166 may narrow the search queries using the supplemental information obtained the event (e.g., by creating a search query that specifies: the specific actors of the movie using their names, the time period of the era, the locations of the setting, and other topics related to the event).

SSS module 166 may create search queries based on the queries determined by the rules of the model and narrow or refine the queries with the topics related to the event. SSS may store the search queries in a memory of SSS module 166 and tag the stored search queries with an identifier of the event. In the future, if SSS module 166 determines that a user of computing device 110 is experiencing the event, SSS module 166 may retrieve the stored queries, cause search module 164 to search the search queries to obtain secondary information about the event, and send the secondary information to computing device 110 for presentation while the user is experiencing the event.

SSS module 166 may schedule, for each of the plurality of search queries determined for subsequent search during an event, a respective time or subevent during the event to search the corresponding search query. As used herein "a respective time" may refer to a chronological subevent (e.g., a timestamp, a chapter, a time of day, or some other temporal subevent) or a non-chronological subevent (e.g., an occurrence of something not necessarily bound to any specific time related to the event, such as the occurrence of an action, an appearance of a particular subject, etc.).

SSS module 166 and a model thereof may create rules specifying which query to search in response to which subevent. For example, a model of SSS module 166 may rely on a rule indicating that a popular search query sent to search module 164 during breaks in sports games are searches for scores of other games occurring at that time. During a broadcast of a hockey game between two teams, one rule of SSS module 166 may cause search module 164 to search, during a break in periods, of the hockey game, for scores of other hockey games occurring at the same time. A model of SSS module 166 may rely on a rule indicating that a popular search query sent to search module 164 in response to scoring plays in sports games are searches for statistics of the player(s) that score. Therefore, a different rule of SSS module 166 may cause search module 164 to search, in response to a scoring play during the hockey game, for player stats of the player that scored and the players that assisted during the play.

SSS module 166 may tag predetermined search queries with an identifier of a subevent so that if SSS module 166 determines that the subevent will or has occurred, SSS module 166 can quickly retrieve the predetermined search queries(s) associated with that subevent. For example, if a sub-event is a chronological subevent, the identifier of the subevent may be a specific time tag during the event. If the sub-event is a non-chronological subevent, the identifier of the subevent may be a condition that needs to be satisfied to identify a particular query as being related to a particular subevent. If SSS module 166 determines that a user of computing device 110 is experiencing a particular subevent of an event, SSS module 166 may retrieve the stored queries that have been tagged with the identifier associated with that subevent, cause search module 164 to search the retrieved search queries to obtain secondary information about that subevent, and send the secondary information to computing device 110 for presentation before during or after the user experiences that subevent.

After SSS module 166 receives explicit consent from users of client devices (e.g., computing device 110) that subscribe to its second-screen information service to use, analyze, and store information about the users and the client devices, SSS module 166 may determine whether the users of the client devices are experiencing an event and responsive to determining that a user of a client device is experiencing an event, SSS module 166 may execute searches of search queries related to the event and output, to the client devices during the event, the information returned from the searches. For example, SSS module 166 may receive data from computing device 110 indicating that a user of computing device 110 is in attendance at a hockey game with computing device 110 in his or her possession. SSS module 166 may determine the one or more search queries associated with the hockey game and in response to receiving additional data from computing device 110 indicating when a particular subevent has or is about to occur, SSS module 166 may cause search module 164 to execute a search of the one or more search queries tagged with the particular subevent. SSS module 166 may receive information obtained by search module 164 from execution of the search and output the information to computing device 110 with instructions on when, during the event, to display or otherwise present the information to a user.

Computing device 110 represents an individual mobile or non-mobile computing device. Examples of computing device 110 include a mobile phone, a tablet computer, a laptop computer, a desktop computer, a server, a mainframe, a set-top box, a television, a wearable device (e.g., a computerized watch, computerized eyewear, computerized gloves, etc.), a home automation device or system (e.g., an intelligent thermostat or home assistant device), a personal digital assistants (PDA), a gaming system, a media player, an e-book reader, a mobile television platform, an automobile navigation or infotainment system, or any other type of mobile, non-mobile, wearable, and non-wearable computing device configured to execute or a second-screen information service via network 130.

UIC 112 of computing device 110 may function as an input and/or output device for computing device 110. UIC 112 may be implemented using various technologies. For instance, UIC 112 may function as an input device using presence-sensitive input screens, microphone technologies, infrared sensor technologies, or other input device technology for use in receiving user input. UIC 112 may function as output device configured to present output to a user using any one or more display devices, speaker technologies, haptic feedback technologies, or other output device technology for use in outputting information to a user.

In general, SSC module 114 is a client to the second-screen information service provided by SSS module 166 of RSS 160. SSC module 114 provides secondary content that users experiencing primary content will likely want to search for. That is, SSC module 114 enables computing device 110 to access the second-screen information service of SSS module 166 to automatically obtain current, secondary information, recently obtained from searches executed by RSS 160 at predetermined times during a user experience of primary content of a live or pre-recorded event. The secondary information obtained by SSC module 114 from SSS module 166 is meant to supplement or otherwise enhance a user experience of primary content of the event. SSC module 114 determines when a user of computing device 110 is experiencing an event and presents (e.g., displays or otherwise outputs) secondary content (e.g., as a proactive search stream) that has been generated and personalized for the user, for his or her current experience of the event.

Module 114 may perform operations described herein using software, hardware, firmware, or a mixture of hardware, software, and firmware residing in and/or executing at computing device 110. Computing device 110 may execute module 114 with multiple processors or multiple devices, as virtual machines executing on underlying hardware, as one or more services of an operating system or computing platform, and/or as one or more executable programs at an application layer of a computing platform of computing device 110.

While a user of computing device 110 is watching or listening to primary content of an event (e.g., a movie being output by media output device 120, a live speaking event or music performance occurring near a location of computing device 110, etc.), SSC module 114 may send a message to SSS module 116 that indicates a user of computing device 110 is watching or listening to the primary content of the event and/or a particular sub-event of the event. In response, SSC module 114 may receive, via network 130, secondary content from SSS module 166 along with instructions for when SSC module 114 is to cause computing device 110 to output the secondary content. SSC module 114 may interpret the instructions received from SSS module 166 and cause UIC 112 to present the secondary content in accordance with the instructions, so that the secondary content is output in-synch with the primary content being experienced by the user.

For example, as shown in FIG. 1, SSC module 114 may cause UIC 112 to present user interface 128 which includes search content portions 118A-118N (collectively, "search content portions 118") displayed in chronological order from times t0-tn. Search content portions 118 may be information cards that contain additional information (i.e., secondary content) related to a corresponding one of media content portions 128. Each one of search content portions 118 may be presented by UIC 112, at approximately the same time or shortly before or after output component 122 presents the corresponding one of media content portions 128. In some examples, search content portions 118 may be annotated with time marks as well as other temporal delimiters such as track, scene, or other logical markers so as to provide a clear indication that SSC module 114 is causing UIC 112 to present search content portions 118 that are relevant to a particular media content portion 128 that is currently being experienced by a user.

In this way, SSC module 114, through access to a second-screen information service, may enable computing device 110 to dynamically obtain and present, current (i.e., up-to-date) secondary content that is relevant to an event, while a user of the computing device is experiencing the event. SSC module 114 may cause computing device 110 to present the secondary content at time during the event when the secondary content is most-relevant to the event.

In this way, rather than require the user to manually provide input to a computing device to search for secondary information, or interact with a pre-produced secondary-screen experience that may rely on stale information, a system, such as system 100, may enable a computing device to automatically present up-to-date secondary information, at a time during an event, when the secondary information is most relevant to a particular timestamp or sub-event, of the event. By presenting current or up-to-date information that is recently obtained, the system may enable a computing device present a more desirable second-screen experience that does not need to be manually updated as the secondary information changes over time.

Figure 2:
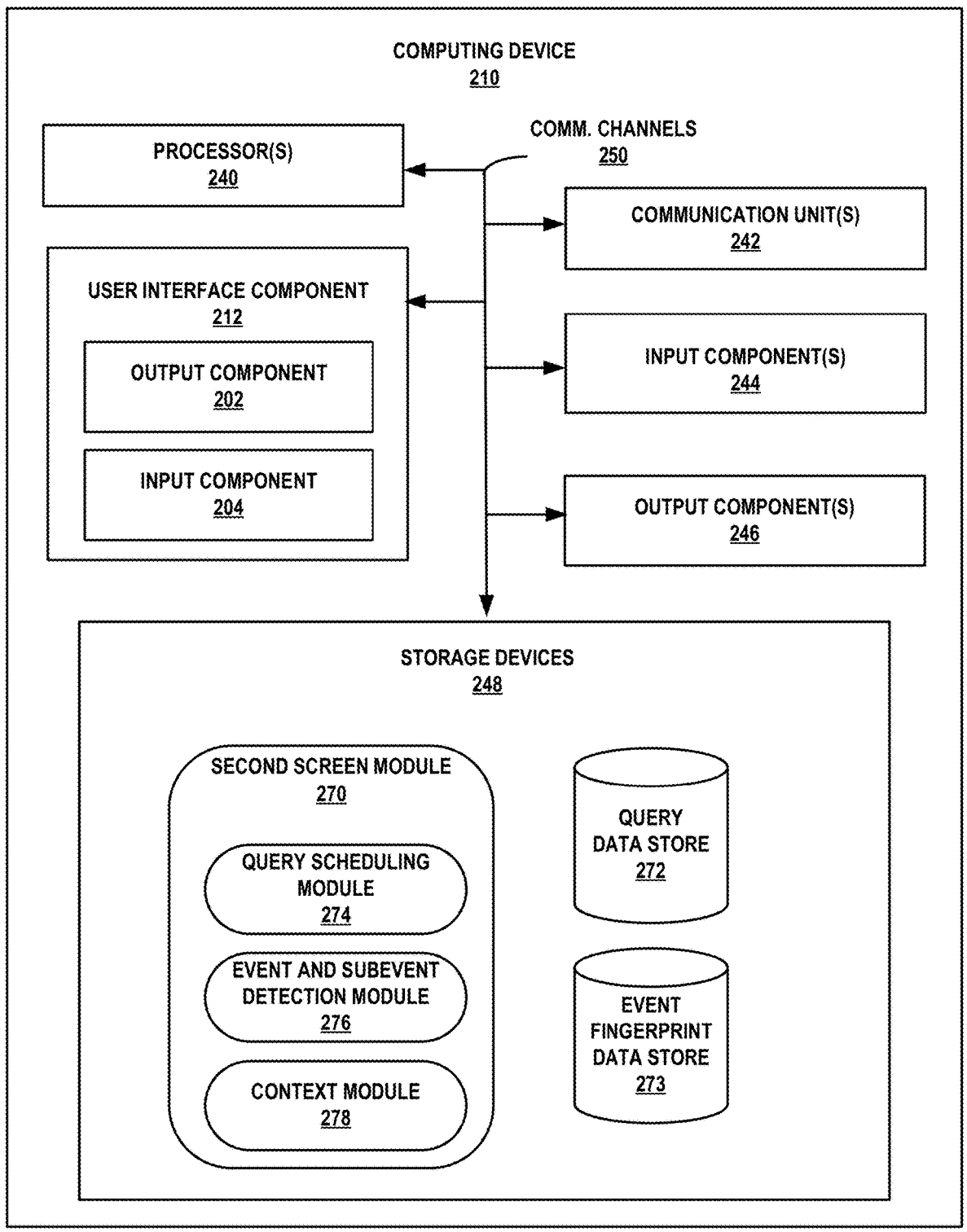
FIG. 2 is a block diagram illustrating an example computing device configured to present information related to an event that has been returned from searches executed at predetermined times when a user of a computing device is experiencing the event, in accordance with one or more aspects of the present disclosure.

FIG. 2 is a block diagram illustrating an example computing device configured to present information related to an event, that has been returned from searches executed at predetermined times when a user of a computing device is experiencing the event, in accordance with one or more aspects of the present disclosure. Computing device 210 of FIG. 2 is described below as an example of computing device 110 of FIG. 1. FIG. 2 illustrates only one particular example of computing device 210, and many other examples of computing device 210 may be used in other instances and may include a subset of the components included in example computing device 210 or may include additional components not shown in FIG. 2.

As shown in the example of FIG. 2, computing device 210 includes user interface component (UIC) 212, one or more processors 240, one or more communication units 242, one or more input components 244, one or more output components 246, and one or more storage components 248. UIC 212 includes output component 202 and input component 204. Storage components 248 of computing device 210 include second screen module 270 and query data store 272 and event fingerprint data store 273. Second screen module 270 also includes query scheduling module 274, event and subevent detection (ESD) module 276, and context module 278.

Communication channels 250 may interconnect each of the components 212, 240, 242, 244, 246, and 248 for inter-component communications (physically, communicatively, and/or operatively). In some examples, communication channels 250 may include a system bus, a network connection, an inter-process communication data structure, or any other method for communicating data.

One or more communication units 242 of computing device 210 may communicate with external devices via one or more wired and/or wireless networks by transmitting and/or receiving network signals on the one or more networks. Examples of communication units 242 include a network interface card (e.g. such as an Ethernet card), an optical transceiver, a radio frequency transceiver, a GPS receiver, or any other type of device that can send and/or receive information. Other examples of communication units 242 may include short wave radios, cellular data radios, wireless network radios, as well as universal serial bus (USB) controllers.

One or more input components 244 of computing device 210 may receive input. Examples of input are tactile, audio, and video input. Input components 242 of computing device 210, in one example, includes a presence-sensitive input device (e.g., a touch sensitive screen, a PSD), mouse, keyboard, voice responsive system, video camera, microphone or any other type of device for detecting input from a human or machine. In some examples, input components 242 may include one or more sensor components one or more location sensors (GPS components, Wi-Fi components, cellular components), one or more temperature sensors, one or more movement sensors (e.g., accelerometers, gyros), one or more pressure sensors (e.g., barometer), one or more ambient light sensors, and one or more other sensors (e.g., microphone, camera, infrared proximity sensor, hygrometer, and the like). Other sensors may include a heart rate sensor, magnetometer, glucose sensor, hygrometer sensor, olfactory sensor, compass sensor, step counter sensor, to name a few other non-limiting examples.

One or more output components 246 of computing device 110 may generate output. Examples of output are tactile, audio, and video output. Output components 246 of computing device 210, in one example, includes a PSD, sound card, video graphics adapter card, speaker, cathode ray tube (CRT) monitor, liquid crystal display (LCD), or any other type of device for generating output to a human or machine.

UIC 212 of computing device 210 may be similar to UIC 112 of computing device 110 and includes output component 202 and input component 204. Output component 202 may be a display component, such as a screen at which information is displayed by UIC 212 and input component 204 may be a presence-sensitive input component that detects an object at and/or near display component 202. Output component 202 and input component 204 may be a speaker and microphone pair or any other combination of one or more input and output components, such as input components 244 and output components 244. In the example of FIG. 2, UIC 212 may present a user interface (such as user interface 116 of FIG. 1).

While illustrated as an internal component of computing device 210, UIC 212 may also represent an external component that shares a data path with computing device 210 for transmitting and/or receiving input and output. For instance, in one example, UIC 212 represents a built-in component of computing device 210 located within and physically connected to the external packaging of computing device 210 (e.g., a screen on a mobile phone). In another example, UIC 212 represents an external component of computing device 210 located outside and physically separated from the packaging or housing of computing device 210 (e.g., a monitor, a projector, etc. that shares a wired and/or wireless data path with computing device 210).

One or more storage components 248 within computing device 210 may store information for processing during operation of computing device 210 (e.g., computing device 210 may store data accessed by modules 270, 274, 276, and 278, and data stores 272 and 273 during execution at computing device 210). In some examples, storage component 248 is a temporary memory, meaning that a primary purpose of storage component 248 is not long-term storage. Storage components 248 on computing device 210 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage components 248, in some examples, also include one or more computer-readable storage media. Storage components 248 in some examples include one or more non-transitory computer-readable storage mediums. Storage components 248 may be configured to store larger amounts of information than typically stored by volatile memory. Storage components 248 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage components 248 may store program instructions and/or information (e.g., data) associated with modules 270, 274, 276, and 278, and data stores 272 and 273. Storage components 248 may include a memory configured to store data or other information associated with modules 270, 274, 276, and 278, and data stores 272 and 273.

One or more processors 240 may implement functionality and/or execute instructions associated with computing device 210. Examples of processors 240 include application processors, display controllers, auxiliary processors, one or more sensor hubs, and any other hardware configure to function as a processor, a processing unit, or a processing device. Modules 270, 274, 276, and 278 may be operable by processors 240 to perform various actions, operations, or functions of computing device 210. For example, processors 240 of computing device 210 may retrieve and execute instructions stored by storage components 248 that cause processors 240 to perform the operations modules 270, 274, 276, and 278. The instructions, when executed by processors 240, may cause computing device 210 to store information within storage components 248.

Second screen module 270 may include all functionality of SSS module 162 of RSS 160 of FIG. 1 and SSC module 114 of computing device 110 of FIG. 1 and may perform similar operations as SSS modules 162 and SSC module 114 for providing a second-screen experience that automatically provides up-to-date, secondary information, related to a live or pre-recorded event occurring in the presence of computing device 210. That is, second screen module 270 may collect and output information related to an event that is to be presented via UIC 212 to a user of computing device 210 when the user is experiencing the event.

After receiving explicit consent from a user to store and make use of personal information, context module 278 may process and analyze contextual information associated with computing device 210 to define a context of computing device 210 or a context of a user of computing device 210. Context module 278 may encrypt or otherwise treat the information being analyzed and/or stored to remove the actual identity of the user before storing or making use of the personal. For example, the information may be treated by context module 278 so that any personally-identifiable information is removed when stored or sent to a remote computing device (e.g., RSS 160) for processing.

A context of computing device 210 may specify one or more characteristics associated with computing device 210 and/or the user of computing device 210 and his or her physical and/or virtual environment at various locations and times. For example, context module 278 may determine, as part of a context of computing device 210, a physical location associated with computing device 210 at a particular time based on the contextual information associated with computing device 210 from that particular time. As the contextual information changes (e.g., based on sensor information indicative of movement over time), context module 278 may update the physical location in the determined context of computing device 210.

The types of information that define a context of a computing device for a particular location and/or time are too numerous to list. As some examples, a context of a computing device may specify: an acoustic fingerprint, a video fingerprint, a location, a movement trajectory, a direction, a speed, a name of an establishment, a street address, a type of place, a building, weather conditions, and traffic conditions, at various locations and times. The context of the computing device may further include calendar information that defines a meeting or an event associated with various locations and times, webpage addresses viewed at various locations and times, text entries made in data fields of the webpages viewed at various locations and times (e.g., search or browsing histories), and other application usage data associated with various locations and times. The context of the computing device may further include information about audio and/or video streams accessed by or being broadcast in the presence of the computing device at various locations and times, television or cable/satellite broadcasts accessed by or being broadcast in the presence the computing device at various locations and times, and information about other services accessed by the computing device at various locations and times.

Context module 278 may share the context of computing device 210 with ESD module 276 from which ESD module 276 may determine whether a user of computing device 210 is experiencing (e.g., viewing, listening to, or otherwise in the presence of an event). Context module 278 may respond to a request from ESD module 276 for a current context or current state associated with computing device 210, by outputting data to ESD module 278 that specifies the current state or context of the user.

Query data store 272 is configured to store search queries for subsequent search during an event. Each of the search queries stored at query data store 272 may be tagged with one or more event identifiers and/or one or more subevent identifiers. ESD module 276 may perform a look-up of an event identifier or subevent identifier and in response retrieve one or more search queries that are tagged with the identifiers.

Event fingerprint data store 273 is configured to store fingerprints that correspond to particular subevents of an event. The fingerprints may be acoustic fingerprints, video fingerprints, radio fingerprints, or any other type of unique code generated from contextual information sampled by a computing device in the presence of an event. Each of the fingerprints stored at query data store 273 may be searchable. For example, ESD module 276 may perform a look-up of a particular portion of contextual information (e.g., a sound sample, video sample, image, etc.) and in response retrieve one or more event or subevent identifiers.

Query scheduling module 274 is configured to determine one or more search queries for subsequent execution during an event and map or schedule the one or more search queries for subsequent execution at respective times or at the occurrence of respective subevents, of the event. The respective time for executing a search of a particular search query may correspond to a chronological portion of a chronological timeline of the event or may correspond to a specific action that is expected to occur during the event. In other words, query scheduling module 274 may identify, at an initial time, an event that multiple users of other computing devices are likely to experience a subsequent time, cache (e.g., at query data store 272), for search at the subsequent time, a plurality of search queries.

Query scheduling module 274 may generate a "curated flow" of search queries for execution during an event. The curated flow may be dynamic or pre-created.

Query scheduling module 274 may automatically schedule, for at least one of the plurality of search queries, the respective time during the event to search the corresponding search query. For example, for live events such as sports, parades, and political events, query scheduling module 274 may create a curated flow dynamically. Because there could many people experiencing the same event at the same time, query scheduling module 274 may create the curated flow once and share the curated flow with as many other computing devices as necessary for simultaneous execution at each respective device. Even though a curated flow may be shared, some personalization could still occur, for example, refraining from executing a search of a particular search query based on personal preferences of users.

Query scheduling module 274 may manually schedule, for at least one of the plurality of search queries, the respective time during the event to search the corresponding search query based on user input. For example, for pre-recorded media such as movies, recorded music, live scripted performances, query scheduling module 274 may pre-generate a curated flow based on user-input via a user interface to query scheduling module 274. The pre-generated curated flow may later be updated and curated manually by editors or content monitors to improve the experience later.

Query scheduling module 274 may enable a hybrid automatic and manual scheduling of search queries. For example, for live events such as sports, parades, and political events, query scheduling module 274 may create a curated flow dynamically. However, the curated flow may be updated during the event via a control panel where a person (human curator) is able to cause query schedule module 274 to inject search queries into the "live feed".

In addition, to relying on query scheduling module 274, second screen module 270 may enable third-party content creators (e.g., movie studios, music producers, enterprise customers, employers, governments, and the like) that are provided with tools and capabilities to create custom curated flows for their content. The third parties could decide to annotate scenes of a movie or TV show in more detail, call out information they desire, or even promote certain actors in special ways. This could give content producers incentive to create really full-featured streams (specific cards at specific times in a media experience) to enhance their media. For an enterprise, this concept could be used to create a secondary information source for a company presentation or announcement.

Query scheduling module 274 may rely on a model to identify topics or keywords associated with an event and generate, based on the topics or keywords, a plurality of search queries. Query scheduling module 274 may store the search queries at query data store 272 and tag the stored search queries with an identifier of the event. Query scheduling module 274 may tag predetermined search queries stored at query data store 272 with an identifier of a subevent of an event for faster retrieval if ESD module 276 detects the occurrence of the subevent.

Query scheduling module 274 may determine a plurality of queries for subsequent execution during an event based on the plurality of queries it may determine for a different, yet similar event. In other words, query scheduling module 274 may determine a plurality of search queries for a first event that include one or more prior search queries searched during a second event that took place at an earlier time. The second event may be different than the first event, however the second event may be associated with the topics or keywords associated with the first event. For example, query scheduling module 274 may determine one or more first queries for execution during a basket ball game between teams A and B on a Saturday. On the next day (Sunday), Query scheduling module 274 may determine a second group of queries for execution during a basket ball game between teams C and D. The second group of queries may include some or all of the one or more first queries it determined Saturday for the game between teams A and B since both events were basket ball games.

ESD module 276 is configured to determine whether a user of computing device 210 is experiencing a particular subevent, of an event, and if so, cause second screen module 270 to execute a search of a search query that was prescheduled or mapped to the particular subevent. ESD module 276 may cause second screen module 270 to search a particular search query while continuing to determine that the user of the computing device is experiencing the event.

ESD module 276 may determine that a user of computing device 2010 is experiencing an event in response to determining that ambient audio or video captured by computing device 210 includes indications of sounds or images associated the respective time during the event, at which a search of the particular search query from the plurality of search queries is scheduled to be searched. For example, ESD module 276 may receive contextual information from context module 278 that includes a portion of ambient audio or video captured by a microphone or camera of input components 244. ESC module 276 may compare the contextual information to the event fingerprints stored at data store 273 to determine if the ambient audio or video matches a particular event and/or subevent of a particular event. In response to identifying an event or subevent, ESD module 276 may perform a lookup at query data store 272 for one or more search queries tagged with an identifier of the identified event or subevent. ESD module 276 may obtain a search query that has been tagged with an identifier of the event or subevent identified from the contextual information and cause second screen module 270 to call on search module 164 of RSS 160 to execute a search using the search query. Second screen module 270 may cause UIC 212 to display a portion 118A of the information returned from the search, e.g., as user interface 116.

As the context of computing device 210 changes, ESD module 276 may continuously obtain search queries that are tagged with identifiers of detected subevents and cause second screen module 270 to call on search module 164 of RSS 160 to execute subsequent searches using more recently obtained search queries. Second screen module 270 may cause UIC 212 to update its display of user interface 116 and display additional portions 118B-118N of the information returned from the subsequent searches.

ESD module 276 may enable second screen module 270 to remain synchronized with an experience of an event, even if the event is paused or restarted. For example, for pre-recorded media (movies, music, etc.), ESD module 276 may continuously monitor the contextual information obtained from context module 278 to so as to know when to cause second screen module 270 to start searching for showing particular information (e.g., 118A) and when to scroll that information away and show new information (e.g., 118B-118N). When an event is paused, ESD module 276 may cause second screen module 270 to refrain from scrolling user interface 116 and continue scrolling user interface 116 to show additional portions 118 when the event continues. And since ESD module 276 continuously listens during an event, ESD module 276 can cause second screen module 270 to always display the search information that is relevant to a particular subevent (e.g., even if an event is fast-forwarded or reversed).

Second screen module 270 may package the information displayed by UIC 212 into a card based interface that is displayed as user interface 116. Each card may be displayed while a particular subevent is occurring, is about to occur, or recently occurred.

For a movie event the types of information contained in a card as one of search content portions 118 include: actor bio, other movies the actor was in, place information—where the particular scene takes place, maps, plot, history, background—for historical movies, quick summaries of the important historical background information. References to events, people, and places, meta-information about the movie for example, if it is a movie of note or importance, a card can be shown explaining why (academy awards, groundbreaking movie, important for some reason, and at the end of the movie, related or similar movies to encourage further exploring or watching. Also, during a movie, additional movies that tie-in or help explain what's going on could be suggested for the user to watch. At the end of a movie, related or similar content could be shown and suggested.

For a music event the types of information contained in a card as one of search content portions 118 include: other recordings by the same person and people in the band, when a guest musician is on a recording, show information about that person when he/she is first heard, musical influences, related artists, videos of same song, same artist, and upcoming appearances by artist in your area. Also, during a music event, additional music that ties-in or help explain what's going on could be suggested for the user to listen-to. At the end of a music event, related or similar content could be shown and suggested.

For a television event the types of information contained in a card as one of search content portions 118 include similar information to that of a movie, but also include updates and summaries of previous episodes, a card about a special or surprise guests when the guest appears, etc.

For sporting events the types of information contained in a card as one of search content portions 118 include: stats, scores, past history with current opposing team, replays of important moments, right after that moment occurs, player bios, history, stories, future games, where they are in playoff contention, other games in progress that relate to or are relevant to the current game—score updates, especially, and upcoming appearances in your area.

For other events the types of information contained in a card as one of search content portions 118 include background about event, history of when it occurred, bios of people involved, news happening in the area of the event, weather near the event, travel deals to the location of the event, or any and all other information about the event.

In some examples, second screen module 270 may cause user interface 116 to have two types of experiences. The first type of experience may be for new experiences of an event—that is, when a user of computing device 210 is experiencing an event for a first time and the second type of experience may be when the user is experiencing the event again, e.g., for a second time, third time, and the like. When watching or listening to a new experience, second screen module 270 may cause user interface 116 to look like a proactive search stream with cards that contain content. Clusters might be used to contain a scene, a song, or other logical groups within the experience. After watching or listening to a stream, the user may be able to revisit the stream. Second screen module 270 may cause each content portion 118 to be maintained in a list, shown as a list or as a grid with an icon. The content portion 118 may contain the name, last viewed date, and duration of each stream. The user can then review the stream at any time. With the clusters annotated by scene, track, or other delimiter the user may be able to follow where the cards are related to without actually consuming the media at the same time.

In some examples, second screen module 270 may cause user interface 116 to be decorated and "themed" in a way that is appropriate and complementary to the event. For instance, while watching a movie, the headers or background could use a graphic, a font or color that is associated with the movie.

In some examples, second screen module 270 may enable sharing or the ability to invite other users of other computing devices to view user interface 116. For instance, with automatic synchronization, the content could stream simultaneously for multiple people. For example, to invite someone to join while watching, second screen module 270 may cause a share icon to be shown as part of one of portions 118 that invites an invitee to experience the same content the user of computing device 210 is experiencing.

Figure 3:
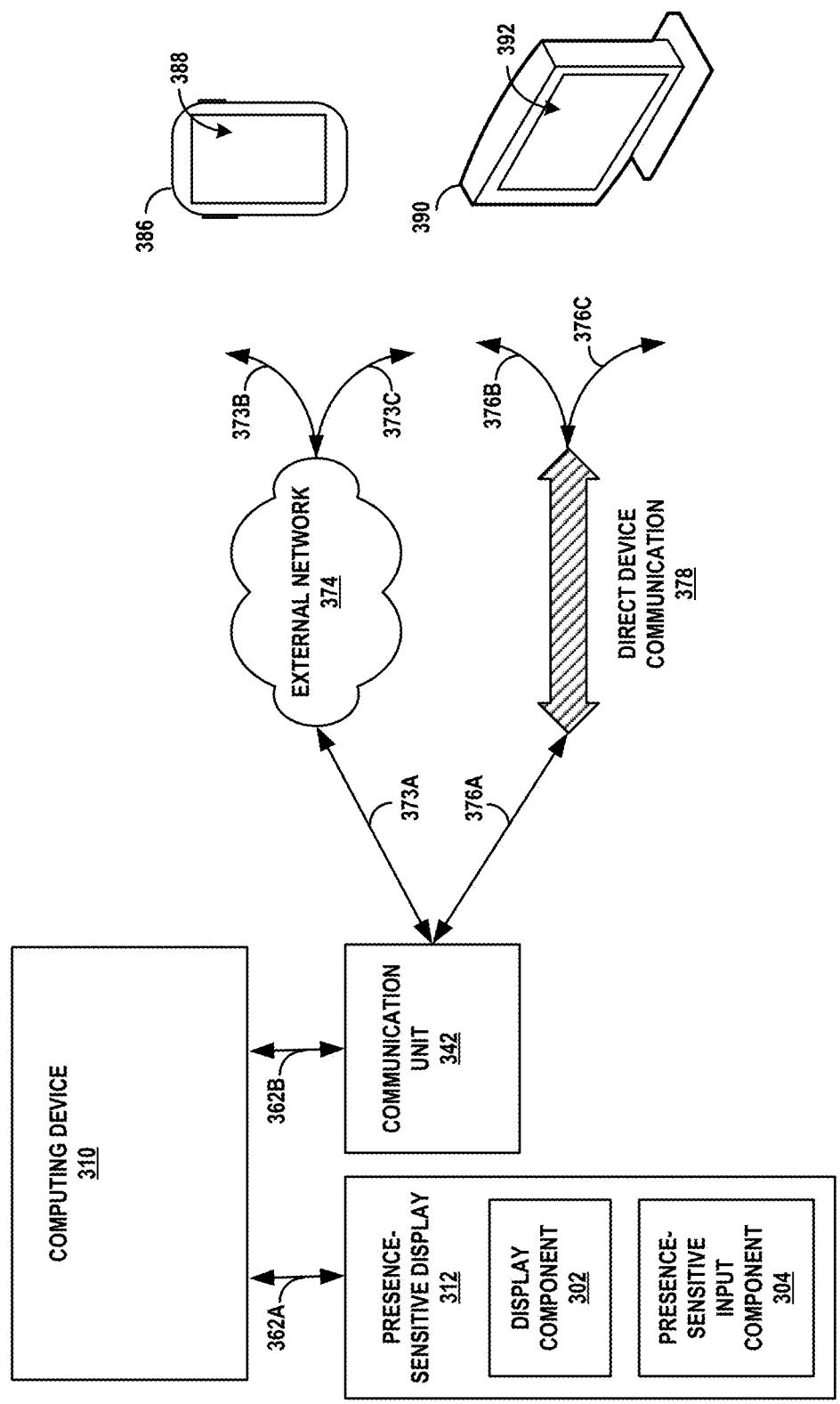
FIG. 3 is a block diagram illustrating an example computing device that presents graphical content for display at a remote device, in accordance with one or more techniques of the present disclosure.

FIG. 3 is a block diagram illustrating an example computing device that presents graphical content for display at a remote device, in accordance with one or more techniques of the present disclosure. Graphical content, generally, may include any visual information that may be output for display, such as text, images, a group of moving images, to name only a few examples. The example shown in FIG. 3 includes a computing device 310, a PSD 312, communication unit 342, mobile device 386, and visual display component 390. In some examples, PSD 312 may be a presence-sensitive display as described in FIGS. 1-2. Although shown for purposes of example in FIGS. 1 and 2 as a stand-alone computing device 110, a computing device such as computing device 310 may, generally, be any component or system that includes a processor or other suitable computing environment for executing software instructions and, for example, need not include a presence-sensitive display.

As shown in the example of FIG. 3, computing device 310 may be a processor that includes functionality as described with respect to processors 240 in FIG. 2. In such examples, computing device 310 may be operatively coupled to PSD 312 by a communication channel 362A, which may be a system bus or other suitable connection. Computing device 310 may also be operatively coupled to communication unit 342, further described below, by a communication channel 362B, which may also be a system bus or other suitable connection. Although shown separately as an example in FIG. 3, computing device 310 may be operatively coupled to PSD 312 and communication unit 342 by any number of one or more communication channels.

In other examples, such as illustrated previously by computing device 110 in FIGS. 1-2, a computing device may refer to a portable or mobile device such as mobile phones (including smart phones), laptop computers, etc. In some examples, a computing device may be a desktop computer, tablet computer, smart television platform, camera, personal digital assistant (PDA), server, or mainframes.

PSD 312 may include display component 302 and presence-sensitive input component 304. Display component 302 may, for example, receive data from computing device 310 and display the graphical content. In some examples, presence-sensitive input component 304 may determine one or more user inputs (e.g., continuous gestures, multi-touch gestures, single-touch gestures) at PSD 312 using capacitive, inductive, and/or optical recognition techniques and send indications of such user input to computing device 310 using communication channel 362A. In some examples, presence-sensitive input component 304 may be physically positioned on top of display component 302 such that, when a user positions an input unit over a graphical element displayed by display component 302, the location at which presence-sensitive input component 304 corresponds to the location of display component 302 at which the graphical element is displayed.

As shown in FIG. 3, computing device 310 may also include and/or be operatively coupled with communication unit 342. Communication unit 342 may include functionality of communication unit 242 as described in FIG. 2. Examples of communication unit 342 may include a network interface card, an Ethernet card, an optical transceiver, a radio frequency transceiver, or any other type of device that can send and receive information. Other examples of such communication units may include Bluetooth, 3G, and WiFi radios, Universal Serial Bus (USB) interfaces, etc. Computing device 310 may also include and/or be operatively coupled with one or more other devices (e.g., input devices, output components, memory, storage devices) that are not shown in FIG. 3 for purposes of brevity and illustration.

FIG. 3 also illustrates mobile device 386 and visual display component 390. Mobile device 386 and visual display component 390 may each include computing and connectivity capabilities. Examples of mobile device 386 may include e-reader devices, convertible notebook devices, hybrid slate devices, etc. Examples of visual display component 390 may include other devices such as televisions, computer monitors, etc. In some examples, visual display component 390 may be a vehicle cockpit display or navigation display (e.g., in an automobile, aircraft, or some other vehicle). In some examples, visual display component 390 may be a home automation display or some other type of display that is separate from computing device 310.

As shown in FIG. 3, mobile device 386 may include a presence-sensitive display 388. Visual display component 390 may include a presence-sensitive display 392. Presence-sensitive displays 388, 392 may include a subset of functionality or all of the functionality of presence-sensitive display 112, 212, and/or 312 as described in this disclosure. In some examples, presence-sensitive displays 388, 392 may include additional functionality. In any case, presence-sensitive display 392, for example, may receive data from computing device 310 and display the graphical content. In some examples, presence-sensitive display 392 may determine one or more user inputs (e.g., continuous gestures, multi-touch gestures, single-touch gestures) at projector screen using capacitive, inductive, and/or optical recognition techniques and send indications of such user input using one or more communication units to computing device 310.

As described above, in some examples, computing device 310 may output graphical content for display at PSD 312 that is coupled to computing device 310 by a system bus or other suitable communication channel. Computing device 310 may also output graphical content for display at one or more remote devices, such mobile device 386 and visual display component 390. For instance, computing device 310 may execute one or more instructions to generate and/or modify graphical content in accordance with techniques of the present disclosure. Computing device 310 may output the data that includes the graphical content to a communication unit of computing device 310, such as communication unit 342. Communication unit 342 may send the data to one or more of the remote devices, such as mobile device 386 and/or visual display component 390. In this way, computing device 310 may output the graphical content for display at one or more of the remote devices. In some examples, one or more of the remote devices may output the graphical content at a presence-sensitive display that is included in and/or operatively coupled to the respective remote devices.

In some examples, computing device 310 may not output graphical content at PSD 312 that is operatively coupled to computing device 310. In other examples, computing device 310 may output graphical content for display at both a PSD 312 that is coupled to computing device 310 by communication channel 362A, and at one or more remote devices. In such examples, the graphical content may be displayed substantially contemporaneously at each respective device. In some examples, graphical content generated by computing device 310 and output for display at PSD 312 may be different than graphical content display output for display at one or more remote devices.

Computing device 310 may send and receive data using any suitable communication techniques. For example, computing device 310 may be operatively coupled to external network 374 using network link 373A. Each of the remote devices illustrated in FIG. 3 may be operatively coupled to network external network 374 by one of respective network links 373B, or 373C. External network 374 may include network hubs, network switches, network routers, etc., that are operatively inter-coupled thereby providing for the exchange of information between computing device 310 and the remote devices illustrated in FIG. 3. In some examples, network links 373A-373C may be Ethernet, ATM or other network connections. Such connections may be wireless and/or wired connections.

In some examples, computing device 310 may be operatively coupled to one or more of the remote devices included in FIG. 3 using direct device communication 378. Direct device communication 378 may include communications through which computing device 310 sends and receives data directly with a remote device, using wired or wireless communication. That is, in some examples of direct device communication 378, data sent by computing device 310 may not be forwarded by one or more additional devices before being received at the remote device, and vice-versa. Examples of direct device communication 378 may include Bluetooth, Near-Field Communication, Universal Serial Bus, WiFi, infrared, etc. One or more of the remote devices illustrated in FIG. 3 may be operatively coupled with computing device 310 by communication links 376A-376C. In some examples, communication links 376A-376C may be connections using Bluetooth, Near-Field Communication, Universal Serial Bus, infrared, etc. Such connections may be wireless and/or wired connections.

In accordance with techniques of the disclosure, computing device 310 may be operatively coupled to visual display component 390 using external network 374. Computing device 310 may determine a plurality of search queries for subsequent search during an event, and schedule, for each of the plurality of search queries, a respective time during the event to search the corresponding search query.

Responsive to determining that a user of computing device 310 is experiencing the event, at the respective time during the event, at which a particular search query from the plurality of search queries is scheduled to be searched, computing device 310 may search the particular search query, and outputting, during the event, an indication of information returned from the execution of the particular search query. For instance, computing device 310 may send data that includes a graphical representation of information returned from a search of a search query to visual display component 390 using external network 374. Visual display component 390, in response to receiving the data using external network 374, may cause PSD 392 to output the graphical representation for display just before, after, or while the user of computing device 310 is experiencing the event.

Figure 4:
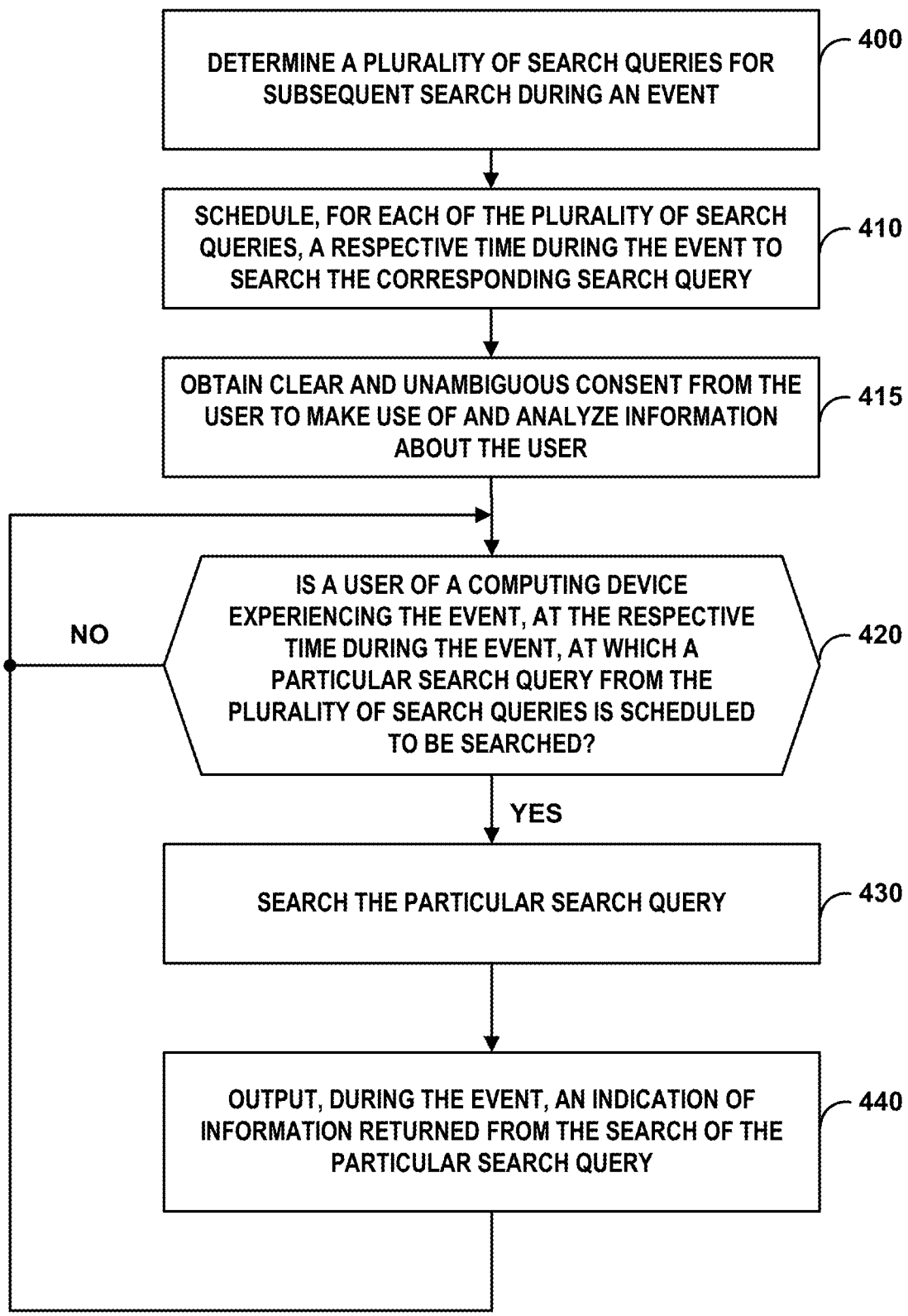
FIGS. 4 and 5 are flowcharts illustrating example operations performed by an example computing system configured to present information related to an event that has been returned from searches executed at predetermined times when a user of a computing device is experiencing the event, in accordance with one or more aspects of the present disclosure.
Figure 5:
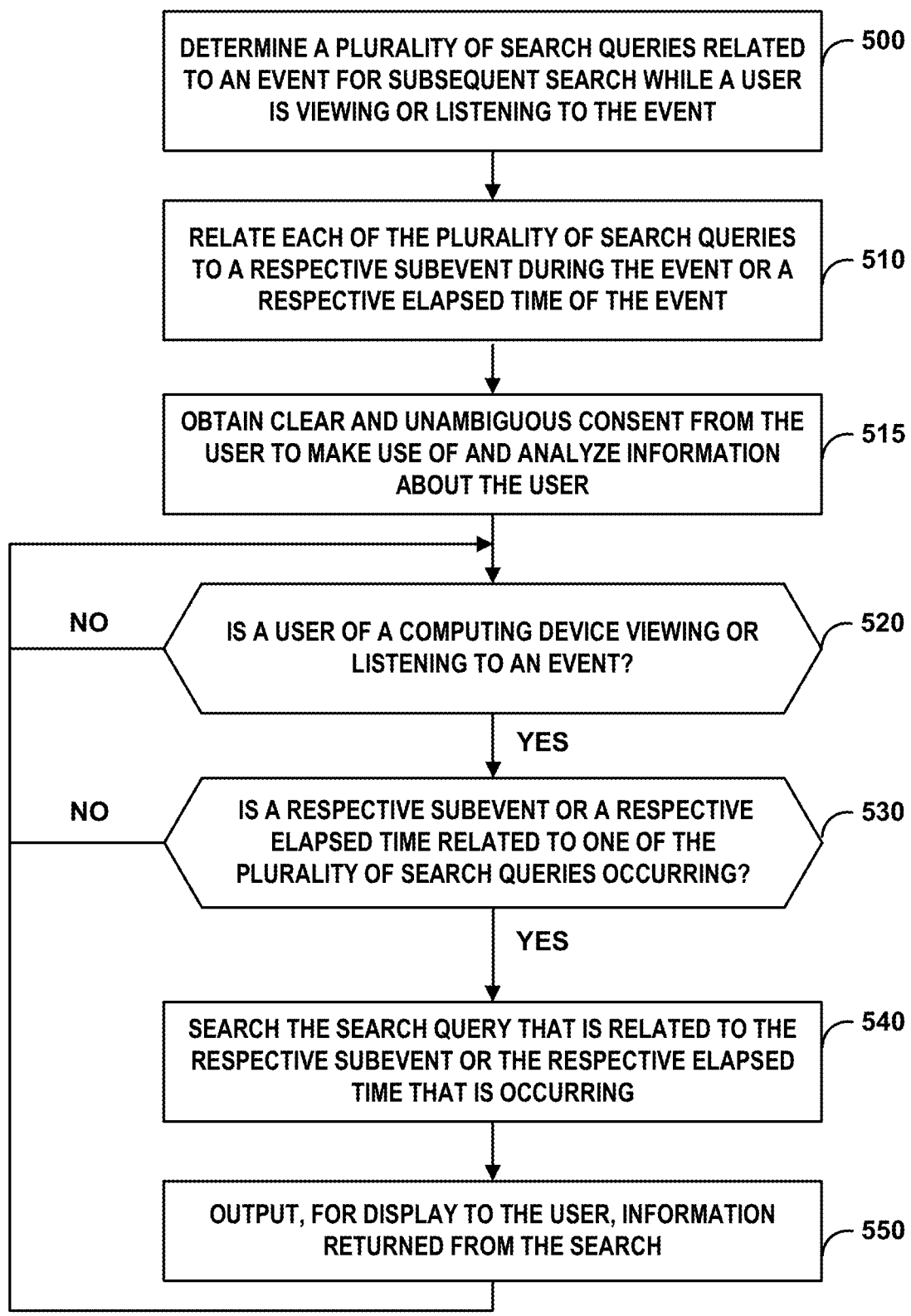

FIGS. 4 and 5 are flowcharts illustrating example operations performed by an example computing system configured to present information related to an event, that has been returned from searches executed at predetermined times when a user of a computing device is experiencing the event, in accordance with one or more aspects of the present disclosure. Operations 400-440 and 500-550 may be performed by a computing device, such as computing device 210, a computing system, such as RSS 160, or a combination of a computing device and computing system, such as system 100. For ease of description, FIGS. 4 and 5 are described in the context of computing device 210 of FIG. 2.

As shown in FIG. 4, in operation, computing device 210 may determine a plurality of search queries for subsequent search during an event (400). For example, a model of query scheduling module 274 may have determined and stored at query data store 272, one or more search queries that other users of other computing devices have searched during a similar event, to the event that a user of computing device 210 is about to experience.

Computing device 210 may schedule, for each of the plurality of search queries, a respective time during the event to search the corresponding search query (410). For example, in storing the search queries at data store 272, scheduling module 274 may tag each query with a timestamp identifier or subevent identifier indicating under what conditions during an associated event, is the search query to be searched.

Computing device 210 may obtain clear and unambiguous consent from the user to make use of and analyze information about the user and computing device 210 (415). For example, computing device 210 may provide the user with an opportunity to consent or remove consent for computing device 210 to collect contextual information and/or other information about the user. Without consent, computing device 210 may refrain from performing steps 420-440.

Computing device 210 may determine whether a user of computing device 210 is experiencing the event at the respective time during the event at which a particular search query from the plurality of search queries is scheduled to be searched (420). For example, ESD module 276 may receive contextual information from context module 278 indicating ambient sounds or videos being captured by input components 244 at a current time. ESD module 276 may compare the contextual information to the fingerprints stored at data store 273 to obtain one or more event or subevent identifiers associated with the ambient sounds or videos.

If the user is not experiencing the event at the respective time during the event at which a particular search query from the plurality of search queries is scheduled to be searched (420, No path), then computing device 210 continues to determine whether the user of computing device 210 is experiencing the event at the respective time during the event at which the particular search query from the plurality of search queries is scheduled to be searched (420). For example, if none of the fingerprints at data store 273 is a match to the ambient audio or video captured by context module 278, ESD module 276 may refrain from detecting an occurrence of an event or subevent.

If the user is experiencing the event at the respective time during the event at which a particular search query from the plurality of search queries is scheduled to be searched (420, Yes path), then computing device 210 may search the particular search query (430) and output, during the event, an indication of information returned from the search of the particular search query (440). For example, in response to determining that a fingerprint at data store 273 is a match to the ambient audio or video captured by context module 278, ESD module 276 may search data store 272 for any search queries that have been tagged with the subevent identifier associated with the matching fingerprint.

ESD module 276 may cause second screen module 270 to invoke search module 164 of RSS to cause search module 164 to return search information related to the query tagged with the matching subevent identifier. Second screen module 270 may cause UIC 210 to display a graphical indication and/or output an audible indication of the search information to supplement a user's experience of the event.

As shown in FIG. 5, in operation, computing device 210 may determine a plurality of search queries related to an event for subsequent search while a user of computing device 210 is viewing or listening to the event (500). For example, a model of query scheduling module 274 may have determined and stored at query data store 272, one or more search queries that other users of other computing devices have searched during a similar event, to the event that a user of computing device 210 is about to experience or may experience at some time in the future.

Computing device 210 may relate each of the plurality of search queries to a respective subevent during the event or a respective elapsed time of the event (510). For example, in storing the search queries at data store 272, scheduling module 274 may tag each query with a timestamp identifier or subevent identifier indicating under what conditions during an associated event, is the search query to be searched.

Computing device 210 may obtain clear and unambiguous consent from the user to make use of and analyze information about the user and computing device 210 (515). For example, computing device 210 may provide the user with an opportunity to consent or remove consent for computing device 210 to collect contextual information and/or other information about the user. Without consent, computing device 210 may refrain from performing steps 520-550.

Computing device 210 may determine whether a user of computing device 210 is viewing or listening to an event (520). For example, ESD module 276 may receive contextual information from context module 278 indicating ambient sounds or videos being captured by input components 244 at a current time. ESD module 276 may compare the contextual information to the fingerprints stored at data store 273 to obtain one or more event or subevent identifiers associated with the ambient sounds or videos.

If the user is not viewing or listening to an event (520, No path), then computing device 210 continues to determine whether a user of computing device 210 is viewing or listening to an event (520). For example, if none of the fingerprints at data store 273 is a match to the ambient audio or video captured by context module 278, ESD module 276 may refrain from detecting an occurrence of an event or subevent.

If the user is not viewing or listening to an event (520, Yes path), then computing device 210 may determine whether a respective subevent or a respective elapsed time related to one of the plurality of search queries is occurring (530). For example, in response to determining that a fingerprint at data store 273 is a match to the ambient audio or video captured by context module 278, ESD module 276 may search data store 272 for any search queries that have been tagged with the identifier associated with the matching fingerprint.

If no search query tag matches the identifier of the matching fingerprint, then computing device 210 may continue to determine whether a respective subevent or a respective elapsed time related to one of the plurality of search queries is occurring (530, No path). However, if a search query tag from a search query from data store 272 matches the identifier of the matching fingerprint, then computing device 210 may search the search query that is related to the respective subevent or the respective elapsed time that is occurring (540, No path). For example, ESD module 276 may cause second screen module 270 to invoke search module 164 of RSS to cause search module 164 to return search information related to the query tagged with the matching subevent identifier.

Computing device 210 may send, for display to the user, information returned from the search (550). For example, second screen module 270 may cause UIC 210 to display a graphical indication and/or output an audible indication of the search information to supplement a user's experience of the event. For instance, the graphical indication may be displayed as user interface 116 of FIG. 1. After displaying the graphical indication or outputting the audible indication, computing device 210 may return to step (520).

Clause 1. A method comprising: determining a plurality of search queries for subsequent search during an event; scheduling, for each of the plurality of search queries, a respective time during the event to search the corresponding search query; and responsive to determining that a user of a computing device is experiencing the event, at the respective time during the event, at which a particular search query from the plurality of search queries is scheduled to be searched: searching the particular search query; and outputting, by the computing device, during the event, an indication of information returned from the execution of the particular search query.

Clause 2. The method of clause 1, wherein the particular search query is searched while continuing to determine that the user of the computing device is experiencing the event.

Clause 3. The method of any one of clauses 1-2, wherein at the respective time for at least one of the plurality of search queries corresponds to a chronological portion of a chronological timeline of the event.

Clause 4. The method of any one of clauses 1-3, wherein at the respective time for at least one of the plurality of search queries corresponds to a specific action that is expected to occur during the event.

Clause 5. The method of any one of clauses 1-4, wherein the computing device automatically schedules, for at least one of the plurality of search queries, the respective time during the event to search the corresponding search query.

Clause 6. The method of any one of clauses 1-5, wherein the computing device schedules, for at least one of the plurality of search queries, the respective time during the event to search the corresponding search query based on user input.

Clause 7. The method of any one of clauses 1-6, further comprising: identifying, at an initial time, the event in response to determining that multiple users of other computing devices are likely to experience the event at a subsequent time; and caching, by the computing device, for search at the subsequent time, the plurality of search queries.

Clause 8. The method of any one of clauses 1-7, wherein determining the plurality of search queries for subsequent search during the event comprises: identifying topics or keywords associated with the event; and generating, based on the topics or keywords, the plurality of search queries.

Clause 9. The method of clause 8, wherein the event is a first event and the plurality of search queries include one or more prior search queries searched during a second event, the second event being different than the first event, the second event being associated with the topics or keywords associated with the first event.

Clause 10. The method of any one of clauses 1-9, further comprising: determining that the user of the computing device is experiencing the event in response to determining that ambient audio or video captured by the computing device includes indications of sounds or images associated the respective time during the event, at which a search of the particular search query from the plurality of search queries is scheduled to be searched.

Clause 11. A computing system comprising: at least one processor; and a memory comprising instructions that, when executed, cause the at least one processor to: determine a plurality of search queries for subsequent search during an event; schedule, for each of the plurality of search queries, a respective time during the event to search the corresponding search query; and responsive to determining that a user of a computing device is experiencing the event, at the respective time during the event, at which a particular search query from the plurality of search queries is scheduled to be searched: search the particular search query; and automatically send, to the computing device for subsequent display during the event, an indication of information returned from the search of the particular search query.

Clause 12. The computing system of clause 11, wherein the instructions, when executed, cause the at least one processor to search the particular search query while continuing to determine that the user of the computing device is experiencing the event.

Clause 13. The computing system of any one of clauses 11-12, wherein at the respective time for at least one of the plurality of search queries corresponds to a chronological portion of a chronological timeline of the event.

Clause 14. The computing system of any one of clauses 11-13, wherein at the respective time for at least one of the plurality of search queries corresponds to a specific action that is expected to occur during the event.

Clause 15. The computing system of any one of clauses 11-14, wherein the indication of information returned from the search of the particular search query includes instructions for causing the computing device to display the information at a specific time during the event that occurs after the respective time during the event, at which the particular search query from the plurality of search queries was scheduled to be searched.

Clause 16. A computer-readable storage medium comprising instructions that, when executed, cause at least one processor of a computing system to: determine a plurality of search queries for subsequent search during an event; schedule, for each of the plurality of search queries, a respective time during the event to search the corresponding search query; and responsive to determining that a user of a computing device is experiencing the event, at the respective time during the event, at which a particular search query from the plurality of search queries is scheduled to be searched: search the particular search query; and automatically send, to the computing device for subsequent display during the event, an indication of information returned from the search of the particular search query.

Clause 17. The computer-readable storage medium of clause 16, wherein the instructions, when executed, cause the at least one processor to search the particular search query while continuing to determine that the user of the computing device is experiencing the event.

Clause 18. The computer-readable storage medium of any one of clauses 16-17, wherein at the respective time for at least one of the plurality of search queries corresponds to a chronological portion of a chronological timeline of the event.

Clause 19. The computer-readable storage medium of any one of clauses 16-18, wherein at the respective time for at least one of the plurality of search queries corresponds to a specific action that is expected to occur during the event.

Clause 20. The computer-readable storage medium of any one of clauses 16-19, wherein the instructions, when executed, cause the at least one processor to: automatically schedule, for at least one of the plurality of search queries, the respective time during the event to search the corresponding search query; or schedule, for at least one of the plurality of search queries, the respective time during the event to search the corresponding search query based on user input received by the computing system from a human producer of the event.

Clause 21. The computing system of clause 11, comprising means for performing any of the methods of clauses 1-10.

Clause 22. The computer-readable storage medium of clause 16, comprising further instructions that, when executed configure the one or more processors of the computing system of clause 11 to perform any of the methods of clauses 1-10.

Clause 23. A computing device comprising means for performing any of the methods of clauses 1-10.

Clause 24. A computer-readable storage medium comprising instructions that when executed, cause at least one processor of a computing device to perform any of the methods of clauses 1-10.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable medium may include computer-readable storage media or mediums, which corresponds to a tangible medium such as data storage media, or communication media including any medium that facilitates transfer of a computer program from one place to another, e.g., according to a communication protocol. In this manner, computer-readable medium generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other storage medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage mediums and media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable medium.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various embodiments have been described. These and other embodiments are within the scope of the following claims.

What is claimed is:

1. A method comprising:
   obtaining data indicative of which searches were executed by a search service when a media service was outputting various types of events experienced by users of multiple computing devices;
   determining, based on the data, popular search queries searched by the multiple computing devices while the users experienced a same type of event;
   generating, based on the popular search queries, a rule of a machine-learned model that specifies a particular search query from the popular search queries to execute when a specific action occurs while a user of a computing device experiences a future output of the same type of event;
   storing the particular search query with an identifier of the specific action;
   determining that the user of the computing device is experiencing a present output of the same type of event in response to determining that ambient audio or video captured by the computing device includes indications of sounds or images associated with the same type of event; and
   responsive to determining that the user of the computing device is experiencing the present output of the same type of event:
      determining whether the specific action has or is about to occur during the present output of the same type of event;
      responsive to determining that the specific action has or is about to occur during the present output of the same type of event, retrieving, based on the identifier of the specific action, the particular search query;
      executing a search of the particular search query; and
      outputting, by the computing device, during the present output of the same type of event, an indication of information returned from executing the search of the particular search query.

2. The method of claim 1, wherein executing the search of the particular search query comprises:
   obtaining supplemental information about the present output of the same event; and
   while continuing to determine that the user of the computing device is experiencing the present output of the same event, modifying the particular search query based on the supplemental information prior to executing the search of the particular search query.

3. The method of claim 1, further comprising:
   scheduling a corresponding time during the present output of the same event to search the particular search query, wherein determining whether the specific action has or is about to occur during the present output of the same event comprises determining whether the corresponding time during the present output of the same type of event corresponds to a portion of a chronological timeline of the event.

4. The method of claim 3, wherein the computing device automatically schedules the corresponding time during the present output of the same type of event to search the particular search query.

5. The method of claim 3, wherein the computing device schedules the corresponding time during the present output of the same type of event to search the particular search query based on user input.

6. The method of claim 1, further comprising:
identifying, at an initial time, the present output of the same type of event in response to determining that multiple users of other computing devices are likely to experience the same type of event at a subsequent time; and
caching, by the computing device, the particular search query for the retrieval of the particular search query during the present output of the same type of event.

7. The method of claim 2, wherein the supplemental information comprises topics or keywords associated with the same type of event.

8. The method of claim 7, wherein:
the same type of event comprises a first event and a second event,
the second event is different than the first event, and
the first event and the second event are each associated with the topics or keywords of the supplemental information.

9. A computing system comprising:
at least one processor; and
a memory comprising instructions that, when executed, cause the at least one processor to:
obtain data indicative of which searches were executed by a search service when a media service was outputting various types of events experienced by users of multiple computing devices;
determine, based on the data, popular search queries searched by the multiple computing devices while the users experienced a same type of event;
generate, based on the popular search queries, a rule of a machine-learned model that specifies a particular search query from the popular search queries to execute when a specific action occurs while a user of a computing device experiences a future output of the same type of event;
store the particular search query with an identifier of the specific action;
determine that the user of the computing device is experiencing a present output of the same type of event based on a determination that ambient audio or video captured by the computing device includes indications of sounds or images associated with the same type of event; and
responsive to determining that the user of the computing device is experiencing a present output of the same type of event:
determine whether the specific action has or is about to occur during the present output of the same type of event;
responsive to determining that the specific action has or is about to occur during the present output of the same type of event, retrieve, based on the identifier of the specific action, the particular search query;
execute a search the particular search query; and
automatically send, to the computing device for subsequent display during the present output of the same type of event, an indication of information returned from executing the search of the particular search query.

10. The computing system of claim 9, wherein the instructions, when executed, cause the at least one processor to execute the search of the particular search query by at least:
obtaining supplemental information about the present output of the same type of event; and
while continuing to determine that the user of the computing device is experiencing the present output of the same type of event, modifying the particular search query based on the supplemental information prior to executing the search the particular search query.

11. The computing system of claim 9,
wherein the instructions, when executed, further cause the at least one processor to schedule a corresponding time during the present output of the same type of event to search the particular search query, and
wherein the instructions, when executed, further cause the at least one processor to determine whether the specific action has or is about to occur during the present output of the same type of event by at least determining whether the corresponding time during the present output of the same type of event corresponds to a portion of a chronological timeline of the event.

12. The computing system of claim 9, wherein the indication of information returned from executing the search of the particular search query includes instructions for causing the computing device to display the information at a specific time during the same type of event.

13. A computer-readable storage medium comprising instructions that, when executed, cause at least one processor of a computing system to:
obtain data indicative of which searches were executed by a search service when a media service was outputting various types of events experienced by users of multiple computing devices;
determine, based on the data, popular search queries searched by the multiple computing devices while the users experienced a same type of event;
generate, based on the popular search queries, a rule of a machine-learned model that specifies a particular search query from the popular search queries to execute when a specific action occurs while a user of a computing device experiences a future output of the same type of event;
store the particular search query with an identifier of the specific action;
determine that the user of the computing device is experiencing a present output of the same type of event based on a determination that ambient audio or video captured by the computing device includes indications of sounds or images associated with the same type of event; and
responsive to determining that the user of the computing device is experiencing a present output of the same type of event:
determine whether the specific action has or is about to occur during the present output of the same type of event;
responsive to determining that the specific action has or is about to occur during the present output of the same type of event, retrieve, based on the identifier of the specific action, the particular search query;
execute a search of the particular search query; and
automatically send, to the computing device for subsequent display during the present output of the same type of event, an indication of information returned from executing the search of the particular search query.

14. The computer-readable storage medium of claim 13, wherein the instructions, when executed, cause the at least one processor to execute the search of the particular search query by at least:
obtaining supplemental information about the present output of the same type of event; and
while continuing to determine that the user of the computing device is experiencing the present output of the same type of event, modifying the particular search query based on the supplemental information prior to executing the search of the particular search query.

15. The computer-readable storage medium of claim 13, wherein the instructions, when executed, further cause the at least one processor to schedule a corresponding time during the present output of the same type of event to search the particular search query, and
wherein the instructions, when executed, further cause the at least one processor to determine whether the specific action has or is about to occur during the present output of the same type of event by at least determining whether the corresponding time during the present output of the same type of event corresponds to a portion of a chronological timeline of the event.

16. The computer-readable storage medium of claim 15, wherein the instructions, when executed, cause the at least one processor to:
automatically schedule the corresponding time during the present output of the same type of event to search the particular search query; or
schedule the corresponding time during the present output of the same type of event to search the particular search query based on user input.

17. The method of claim 1, wherein the present output of the same type of event comprises a present output of audio or video by another device that is different than the computing device, wherein determining that ambient audio or video captured by the computing device includes indications of sounds or images associated with the same type of event comprises:
determining that ambient audio or video captured by the computing device matches the audio or video output by the other device.

* * * * *